United States Patent
Chen

(10) Patent No.: US 8,632,382 B2
(45) Date of Patent: Jan. 21, 2014

(54) VEHICLE AIR SYSTEM ASSEMBLIES WITH AIRCAP ASSEMBLIES

(75) Inventor: Debby S. Chen, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1169 days.

(21) Appl. No.: 12/507,842

(22) Filed: Jul. 23, 2009

(65) Prior Publication Data

US 2011/0021131 A1    Jan. 27, 2011

(51) Int. Cl.
*B60H 1/26* (2006.01)
*B60H 1/00* (2006.01)

(52) U.S. Cl.
USPC ............................................. 454/144; 29/428

(58) Field of Classification Search
USPC ............................................. 454/144; 29/428
See application file for complete search history.

(56) References Cited

U.S. PATENT DOCUMENTS

| | | | |
|---|---|---|---|
| 2,169,277 A * | 8/1939 | Okie | 428/499 |
| 2,617,744 A * | 11/1952 | Dixon | 427/366 |
| 2,781,714 A | 2/1957 | Labus | |
| 2,882,809 A | 4/1959 | Nelson | |
| 2,996,255 A | 8/1961 | Boylan | |
| 3,277,811 A | 10/1966 | Karl | |
| 3,362,316 A * | 1/1968 | Froitzheim et al. | 454/144 |
| 3,472,289 A * | 10/1969 | Riordan et al. | 139/425 R |
| 3,550,522 A * | 12/1970 | Bauer et al. | 454/144 |
| 3,919,926 A * | 11/1975 | Yamada | 454/144 |
| 4,175,593 A * | 11/1979 | Sack | 138/110 |
| 4,561,232 A * | 12/1985 | Gladden et al. | 52/385 |
| 4,748,204 A * | 5/1988 | Kawashima et al. | 525/72 |
| 5,052,283 A * | 10/1991 | Altus | 454/144 |
| 5,167,129 A * | 12/1992 | Akasaka | 62/179 |
| 5,677,027 A * | 10/1997 | Masuda et al. | 428/96 |
| 5,904,617 A | 5/1999 | Dausch | |
| 6,120,370 A * | 9/2000 | Asou et al. | 454/137 |
| 6,318,102 B1 * | 11/2001 | Asou et al. | 62/244 |
| 6,383,599 B1 * | 5/2002 | Bell et al. | 428/95 |
| 6,540,037 B2 * | 4/2003 | Sasano et al. | 180/68.1 |
| 6,547,301 B1 * | 4/2003 | Keller | 296/39.3 |
| 6,685,262 B1 * | 2/2004 | Tiesler et al. | 296/214 |
| 6,720,058 B1 * | 4/2004 | Weeks et al. | 428/94 |
| 6,736,442 B2 * | 5/2004 | Gebreselassie et al. | 296/97.23 |

(Continued)

FOREIGN PATENT DOCUMENTS

JP     11192972 A  *  7/1999
JP   2004291869 A  *  3/2003

(Continued)

OTHER PUBLICATIONS

School of GeoSciences / Hardness Tests, http://www.geos.ed.ac.uk/facilities/ionprobe/EpoxyResins/Hardness.html , Feb. 2013.*

(Continued)

*Primary Examiner* — Kang Hu
*Assistant Examiner* — Phillip E Decker
(74) *Attorney, Agent, or Firm* — Dinsmore & Shohl LLP

(57) ABSTRACT

An air system assembly for a vehicle includes a carpet module and an HVAC unit above the carpet module. A floor aircap assembly is associated with the carpet module and has a vertical portion extending upwardly above the carpet module and a horizontal portion extending below the carpet module.

17 Claims, 6 Drawing Sheets

(56) References Cited

U.S. PATENT DOCUMENTS

| | | | |
|---|---|---|---|
| 6,773,340 B2 | 8/2004 | Nakagawa et al. | |
| 6,986,547 B2* | 1/2006 | Parrish | 296/193.07 |
| 7,654,099 B2* | 2/2010 | Mizutani et al. | 62/244 |
| 8,011,472 B2* | 9/2011 | Tanase et al. | 181/286 |
| 2001/0010275 A1* | 8/2001 | Sasano et al. | 180/68.1 |
| 2003/0116993 A1* | 6/2003 | Skarb et al. | 296/146.7 |
| 2004/0062902 A1* | 4/2004 | Henry et al. | 428/92 |
| 2004/0062904 A1* | 4/2004 | Rice et al. | 428/95 |
| 2006/0208378 A1* | 9/2006 | Khambete et al. | 264/46.8 |
| 2007/0249278 A1 | 10/2007 | McClary | |
| 2007/0275207 A1* | 11/2007 | Higgins et al. | 428/95 |
| 2008/0020199 A1* | 1/2008 | Augele et al. | 428/312.6 |
| 2008/0078632 A1* | 4/2008 | Mears et al. | 188/204 R |

FOREIGN PATENT DOCUMENTS

| | | | |
|---|---|---|---|
| JP | 2004291869 A | * | 10/2004 |
| JP | 2007283845 A | * | 11/2007 |
| JP | 2007307920 A | * | 11/2007 |
| JP | 2009132293 A | * | 6/2009 |
| WO | WO 2008/077030 A1 | * | 6/2008 |

OTHER PUBLICATIONS

JP 2007283845A, Tsukada et al, English machine translation, Nov. 2007.*

JP 11192972A, Harada, English machine translation, Jul. 1999.*

Dewidar et al, "Mechanical Properties of Polypropylene-Reinforced Hemp Fiber Composite," Materials Physics and Mechanics, pp. 119-125, Jul. 2012.*

Machinist-Materials, Plastics Comparison Table, http://www.machinist-materials.com/comparison_table_for_plastics.htm, Feb. 2013.*

Harada, JP 11-192972A English machine translation, Jul. 1999.*

Tsukada, JP 2007-283845 A English machine translation, Nov. 2007.*

* cited by examiner

VEHICLE AIR SYSTEM ASSEMBLIES WITH AIRCAP ASSEMBLIES

TECHNICAL FIELD

The present specification generally relates to vehicle air systems and, more specifically, to vehicle air systems with floor aircap assemblies.

BACKGROUND

Vehicles often include a climate control system for maintaining an interior climate of an occupant compartment of the vehicles. Air handling for the climate control system may be provided by a heating, ventilation and air conditioning (HVAC) assembly. The HVAC assembly includes a network of ducts and vents for transferring a flow of air through and out of the vehicles. The airflow in the occupant compartment can enhance occupant comfort, provide for defogging of windows as well as other features. The transfer of fresh air into the occupant compartment and of stale air out of the occupant compartment is typically accomplished via an interconnected system of air vents and air ducts. The air duct openings are positioned in various locations in the occupant compartment, such as in the instrument panel, a pillar, a quarter panel, or the like.

Air ducts may be provided for the controlled flow of air into the occupant compartment of the vehicle and for the controlled flow of air out of the occupant compartment of the vehicle. The air ducts may have other functions as well, and may be part of an integrated air duct assembly. Various considerations influence the configuration of the air ducts. For example, one consideration may be to maintain an effective transfer of airflow both in and out of the vehicle for operation of the HVAC system. Yet another example may be whether an air duct is load-bearing. Such load-bearing air ducts may be formed using a relatively hard plastic material to withstand loads, such as a high-density polyethylene. However, such hard plastic materials may have limited insulating and noise reduction properties. There continues to be a need for air systems that can be used to improve HVAC performance.

SUMMARY

In one embodiment, an air system assembly for a vehicle includes a carpet module and an HVAC unit above the carpet module. A floor aircap assembly is associated with the carpet module and has a vertical portion extending upwardly above the carpet module and a horizontal portion extending below the carpet module.

In another embodiment, a vehicle includes an air system assembly. The vehicle includes a carpet module and a rear HVAC unit above the carpet module. A floor aircap assembly is affixed to a back of the carpet module. A duct connects the HVAC unit and the floor aircap assembly. The floor aircap assembly is formed of a first material and the back of the carpet module is formed of a second material that is different from the first material.

In another embodiment, a vehicle including an air system assembly is provided. The method includes forming a hardsheet for a floor aircap assembly; and affixing the hardsheet to a back of a carpet module at a location remote from a vehicle assembly location thereby providing a single hardsheet/carpet module assemblage for installation in a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
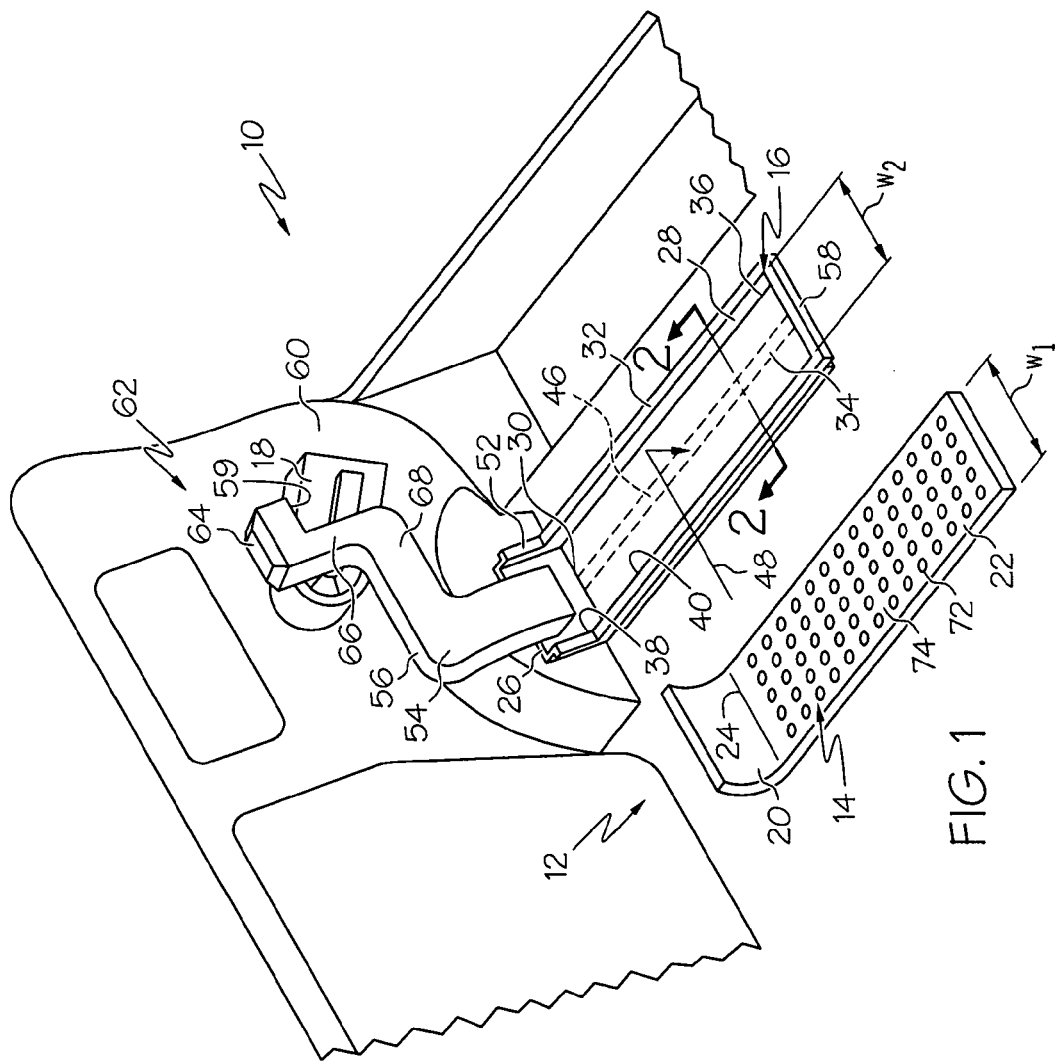
FIG. 1 is a perspective view of a vehicle heating, ventilation and air conditioning unit connected to a floor aircap assembly according to one or more embodiments shown and described herein.

Embodiments described herein generally relate to vehicle heating, ventilation and air conditioning assemblies with aircap assemblies, for example, that run along a floor of a vehicle. Aircap assemblies may be used to deliver and distribute conditioned air from a heating, ventilation and air conditioning (HVAC) unit to a passenger compartment of the vehicle. As shown in FIG. 1, the aircap assembly 12 generally includes a top portion in the form of hardsheet 14 and a lower portion in the form of an aircap 16. Although shown exploded in FIG. 1, the hardsheet 14 and aircap 16 together form an enclosure through which the conditioned air travels during operation of the HVAC unit 18. Various embodiments of the aircap assembly 12 will be described in greater detail herein.

In FIG. 1, a rear portion of the vehicle 10 is illustrated with the carpet module and rear seat removed to show the floor aircap assembly 12. The hardsheet 14 may include a vertical portion 20 connected to a horizontal portion 22 by a bend 24 thereby forming a generally L-shaped hardsheet. The vertical portion 20 and the horizontal portion 22 are illustrated as being substantially planar in shape, however, other configurations are possible. For example, the vertical portion 20 and/or horizontal portion 22 may be concave or convex in cross-sectional shape.

Figure 2:
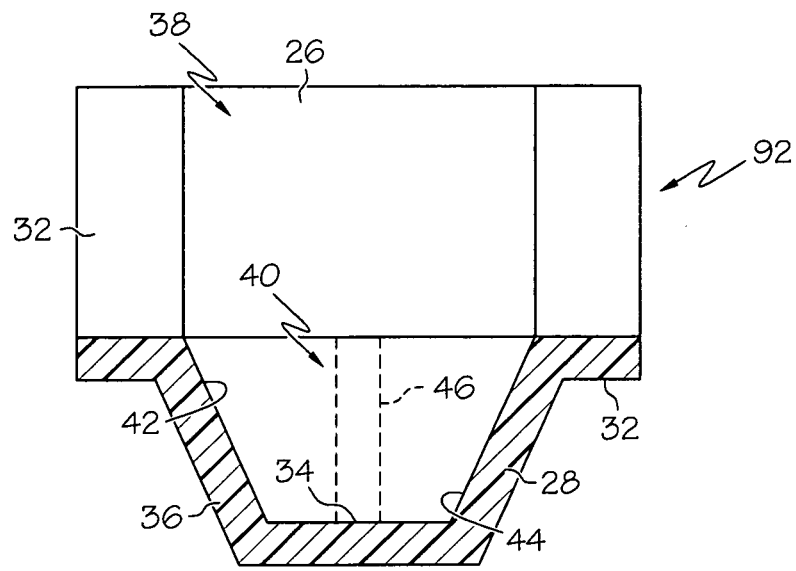
FIG. 2 is a section view of the floor aircap assembly along line 2-2 of FIG. 1 according to one or more embodiments shown and described herein.

The aircap 16 includes a vertical portion 26 connected to a horizontal portion 28 by a bend 30 thereby forming a generally L-shaped aircap 16. Referring also to FIG. 2, an upper flange 32 extends generally about a periphery of the aircap 16 at both the vertical portion 26 and the horizontal portion 28. A bottom 34 of the aircap 16 is offset vertically below the upper flange 32 forming a generally U-shaped recess that is surrounded by an interior wall 36 with an outer opening 38 and 40 located at the vertical portion 26 and the horizontal portion 28, respectively. In the illustrated embodiment, opposite sides 42 and 44 of the interior wall 36 slope toward each other at the bottom 34 forming a somewhat truncated conical, cross-sectional shape, however, other configurations are possible. For example, the opposite sides 42 and 44 may be substantially parallel, rounded, etc.

In some embodiments, the floor aircap assembly 12 may be a load bearing structure. For example, the floor aircap assembly 12 may be located at a position where an occupant's feet may be located or the floor aircap assembly 12 may support a component of the vehicle 10, such as a seat. In these embodiments, the floor aircap assembly 12 may experience vertical loading. In some embodiments, the floor aircap assembly 12 may include support structure, such as rib 46. In the illustrated example, rib 46 runs along the length of the horizontal portion 28 of the aircap 16 and has a height capable of providing additional support to the hardsheet 14. For example, the rib 46 may have a height that is flush with a top of the flange 32. Other support arrangements are possible, such as multiple ribs, for example, spaced along the width of the aircap 16 or support columns arranged over the bottom 34 of the aircap 16. In another embodiment, the hardsheet 14 may carry one or more support structures such as ribs or columns.

As represented by the arrow 48, the hardsheet 14 may be connected to the aircap 16 to form the floor aircap assembly 12. The hardsheet 14 has a width $W_1$ that is greater than a width $W_2$ of the outer openings 38 and 40. A bottom surface of the hardsheet 14 may rest on the upper flange 32 of the aircap 16. Any suitable connection may be used to secure the hardsheet to the aircap 16 at the upper flange 32 such as adhesives, welding, fasteners, snap fittings, etc., which may provide the enclosure.

In some embodiments, the floor aircap assembly 12 has an outer end 58 that is closed by the interior wall 36 and an opposite end top 52 that is open for receiving the lower portion 54 of a duct 56 connected to the HVAC unit 18 at an outlet port 59 of the HVAC unit 18. The duct 56 extends vertically down an interior sidewall 60 of the vehicle at a rear quarter panel 62. The duct 56 has a top portion 64 connected to the outlet port 59, a vertical portion 66 extending downwardly from the top portion 64, a horizontal portion 68 extending toward a front of the vehicle 10 and the lower portion 54 extending vertically downward. The lower portion 54 is received by the floor aircap assembly 12 that extends widthwise within the vehicle 10. However, the floor aircap assembly 12 may extend in any desirable direction, for example, depending on air system requirements of the particular vehicle.

In some embodiments, the hardsheet 14 may have a series of openings 72 spaced-apart over the broad surface 74 of the hard sheet 14 for allowing conditioned air to escape into the occupant compartment. In some embodiments, the floor aircap assembly 12 may include any number of ports (e.g., at the sides, top and/or ends of the floor aircap assembly 12) for connecting various duct structures.

Figure 3:
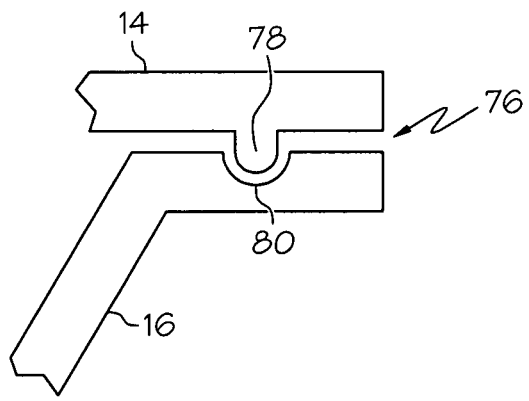
FIG. 3 is a partial view of alignment and sealing features for use with the floor aircap assembly of FIG. 1 according to one or more embodiments shown and described herein.

Referring briefly to FIG. 3, alignment and sealing features 76 may be provided between the hardsheet 14 and the aircap 16 such as the illustrated rib 78 and groove 80 connection. Such alignment features may facilitate proper alignment between the hardsheet 14 and the aircap 16 and provide a tortuous leak path between the hardsheet 14 and aircap 16.

In some embodiments, the hardsheet 14 and/or aircap 16 may be formed of a plastic and fiber blend such as a polypropylene and fiber blend. Use of such plastic fiber blends may improve the insulation characteristics of the floor aircap assembly 12 (e.g., as compared to high-density polyethylene) by reducing heat or cold loss while air travels through the floor aircap assembly 12. The improved insulating quality may also reduce air noise through the floor aircap assembly 12. In some embodiments, the floor aircap assembly 12 (including the hardsheet 14 and/or the aircap 16) may be formed of a different material that forms the duct (e.g., high-density polyethylene).

Figure 4:
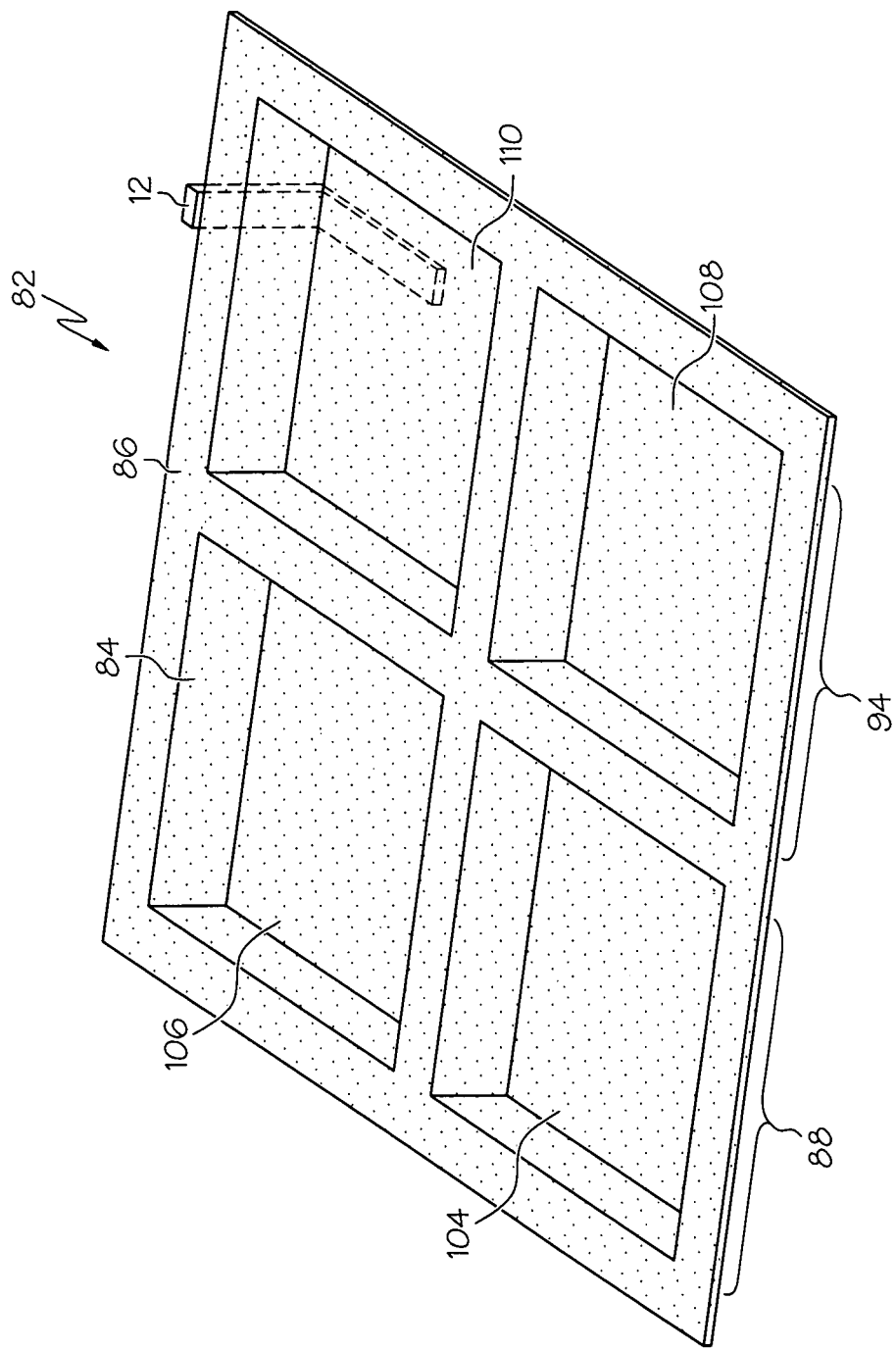
FIG. 4 is a perspective view of a carpet module for use in the vehicle of FIG. 1 according to one or more embodiments shown and described herein.

Referring to FIG. 4, an embodiment of a floor assembly 82 includes the carpet module 84 and the floor aircap assembly 12. The carpet module 84 may be formed separately from the floor aircap assembly 12 by any suitable process. In other embodiments, the carpet module 84 may be formed with one or more components of the floor aircap assembly 12. In some embodiments, the carpet module 84 is a molded carpet module that is shaped to fit the interior of the vehicle 10. The carpet module 84 may be constructed to have an appearance of uniform pile tufts 86 while exhibiting extended wear characteristics. The carpet module 84 may include one or more openings or pores for allowing conditioned air to flow therethrough, for example, received from openings 72 in the hardsheet 14.

Figure 5:
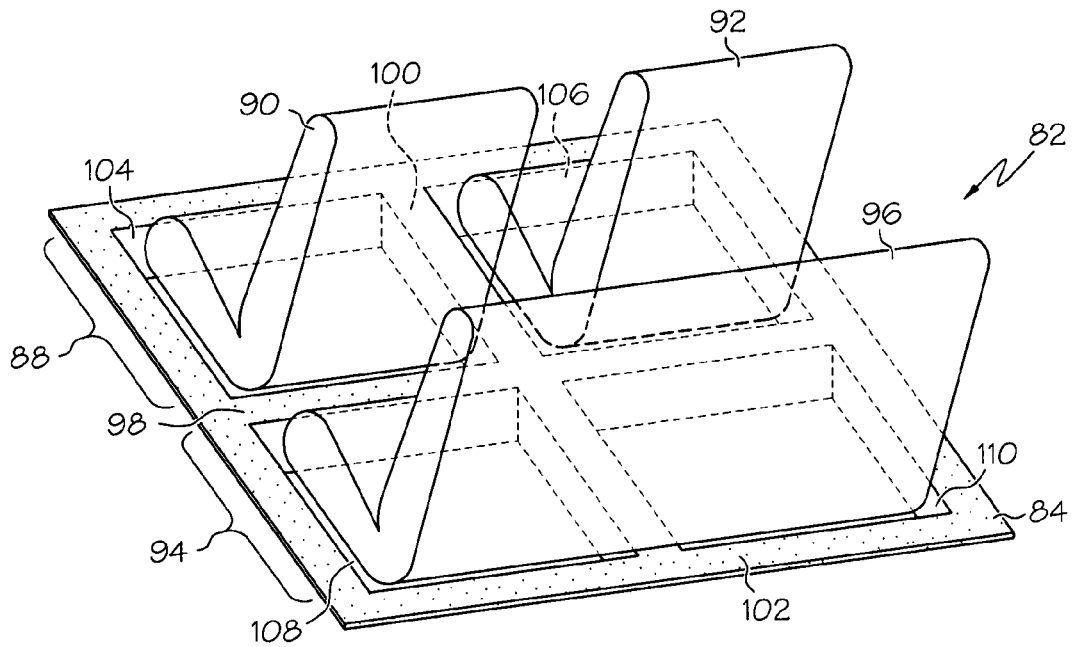
FIG. 5 is a perspective view of the carpet module of FIG. 4 illustrating seat positions according to one or more embodiments shown and described herein.

Referring also to FIG. 5, the floor assembly 82 may be shaped to fit the occupant compartment of the vehicle 10 with a front section 88 provided to accommodate front seats 90 and 92 and a rear section 94 provided to accommodate rear seat 96 or multiple rear seats. In some embodiments, the front seats 90 and 92 overlie a transverse hump 98 while a transmission hump 100 extends generally centrally of the seats 90, 92 and 96. The rear seat 96 may be arranged to overlie edge area 102 that extends about a periphery of the carpet module 84. Passengers in the front seats 90 and 92 may have their feet resting in recessed areas 104 and 106 and passengers in the rear seat 96 may have their feet resting in recessed areas 108 and 110. In other embodiments, the carpet module 84 may not include one or more of the recessed areas 104, 106, 108 and 110.

Figure 6:
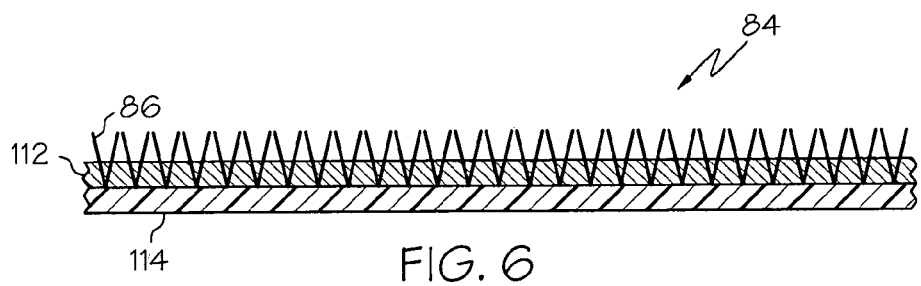
FIG. 6 is a section view of the carpet module of FIG. 4 according to one or more embodiments shown and described herein.

Referring to FIG. 6, the exemplary carpet module 84 is shown in section with pile tufts 86 extending through a backing fabric 112. The pile tufts 86 may be a single type, color and size yarn formed to a substantially uniform tuft height. The arrangement of pile tufts 86 may have the same density over the carpet module 84 or the carpet module 84 may have regions of higher or lower tuft densities. A back coating 114 may be molded onto the underside of the backing fabric 112. The back coating 114 can secure the pile tufts 86 with the backing fabric 112 and aid with insulating properties. The back coating 114 may be formed of any suitable material such as polyethylene, EVA, latex, etc. In some embodiments, the hardsheet 14 is formed of a material that is harder than the back coating 114. While a carpet module 84 with backing fabric 112 and back coating 114 is illustrated, any other suitable carpet configuration may be utilized.

The backing fabric 112 may be formed of any suitable material and may be woven or spun bonded, or mechanically bonded. Polyester and polypropylene may be used to form the backing fabric 112.

Figure 7:
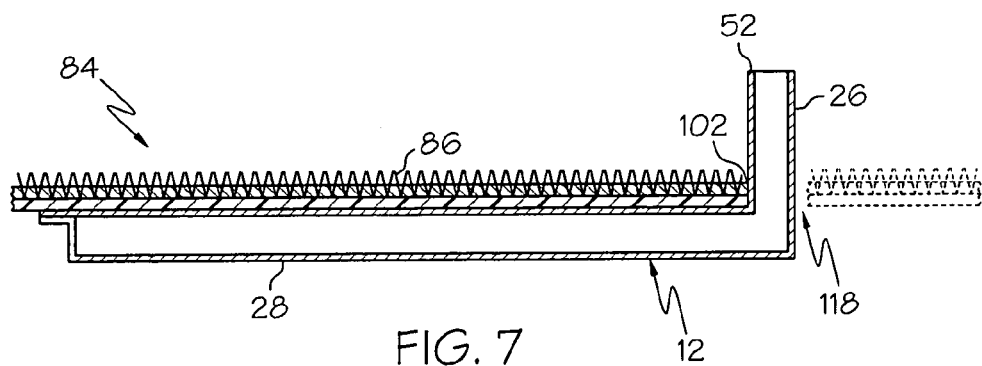
FIG. 7 is a section view of the carpet module of FIG. 2 with the floor aircap assembly of FIG. 1 connected thereto according to one or more embodiments shown and described herein.

The floor aircap assembly 12 is used to deliver conditioned air below the carpet module 84 and away from rear HVAC unit 18. FIG. 7 illustrates the floor aircap assembly 12 connected to the carpet module 84. The floor aircap assembly 12 includes the horizontal portion 28 that generally extends along the width of the carpet module 84 and the vertical portion 26 that extends upwardly from the horizontal portion 28. In some embodiments, the vertical portion 26 extends to the top end 52 that is located above at least a portion of the carpet module 84. In one embodiment, the vertical portion 26 extends to the top end 52 that is above the tufts 86 of the carpet module 84. The vertical portion 26 of the aircap 16 may extend through an opening 118 formed in the carpet module 84 or the vertical portion 26 may extend upwardly adjacent the edge area 102 of the carpet module 84. In another embodiment, a side notch may be removed from the carpet module 84 through which the vertical portion 26 of the floor aircap assembly 12 passes.

Figure 8:
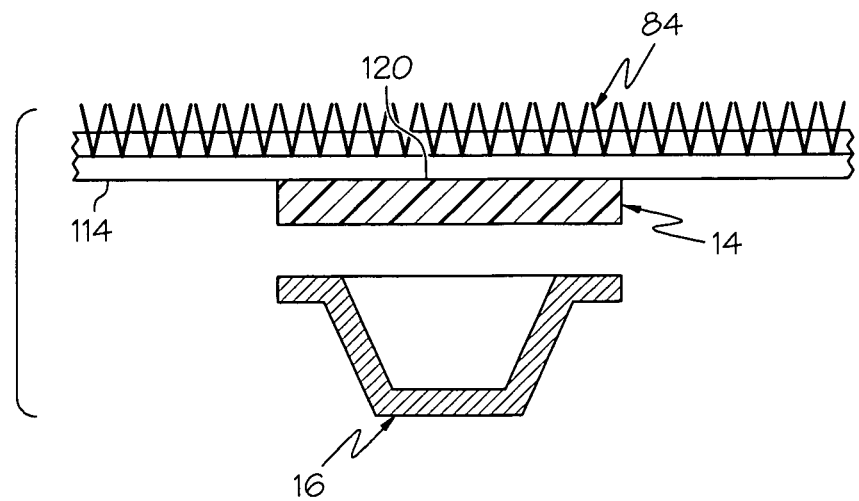
FIG. 8 is a carpet module with a hardsheet connected thereto according to one or more embodiments shown and described herein.

Referring now to FIG. 8, the hardsheet 14 may be connected directly to the carpet module 84 such that the carpet module 84 and the hardsheet 14 is a single piece for installation. In one embodiment, the hardsheet 14 and the carpet module 84 may be formed separately and then the hardsheet 14 may be attached to the back coating 114 without the aircap 16 attached thereto, for example, using adhesives, welding, etc. represented by bond line 120. The aircap 16 may then be attached to the hardsheet 14. In another embodiment, the hardsheet 14 may be molded or otherwise formed integrally with the back coating 114, for example, of a same or different material from that forming the hardsheet 14 such as using a molding process. In one exemplary embodiment, the hardsheet 14 is formed of a material that is harder than a material forming the back coating 114.

In some embodiments, the hardsheet 14 may be attached to or formed with the carpet module 84 at one location and provided to a different location, for example, that is remote from the location where the hardsheet was attached to or formed with the carpet module 84. Such an arrangement can reduce the time of assembling the floor assembly 82.

Figure 9:
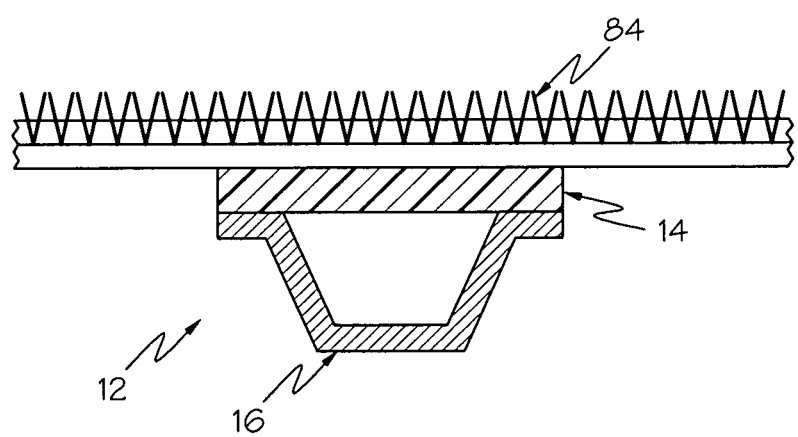
FIG. 9 is another a carpet module with the floor aircap assembly of FIG. 3 connected thereto according to one or more embodiments shown and described herein.

Referring to FIG. 9, in another embodiment, both the entire floor aircap assembly 12 may be attached to the carpet module 84 before installation in the vehicle 10 and connection to the duct 56 thereby forming a single aircap assembly and carpet module assemblage for installation into the vehicle 10. In some embodiments, the floor aircap assembly 12 may be attached to or formed with the carpet module 84 at one location and then provided to a different location, for example, that is remote from the location where the floor aircap assembly 12 was attached to or formed with the carpet module 84. Such an arrangement can reduce the time of assembling the floor assembly 82 at the different location.

Figure 10:
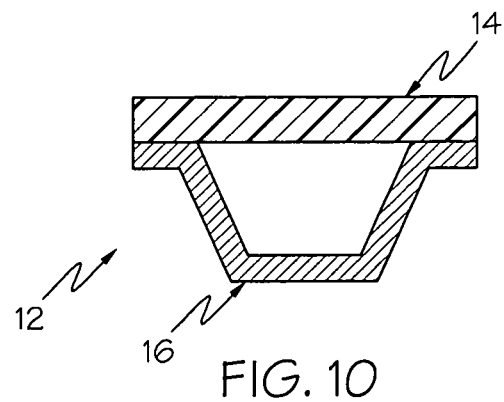
FIG. 10 illustrates an assembled floor aircap assembly according to one or more embodiments shown and described herein.

Referring to FIG. 10, the hardsheet 14 may be first affixed to the aircap 16 to form the floor aircap assembly 12 before affixing the hardsheet 14 to the carpet module 84. In one or more of these embodiments, the floor aircap assembly 12 may be attached to the carpet module 84 at a location different from the location where the floor aircap assembly 12 is assembled. Such an arrangement can reduce the time of assembling the floor assembly 82 at the different location.

Figure 11:
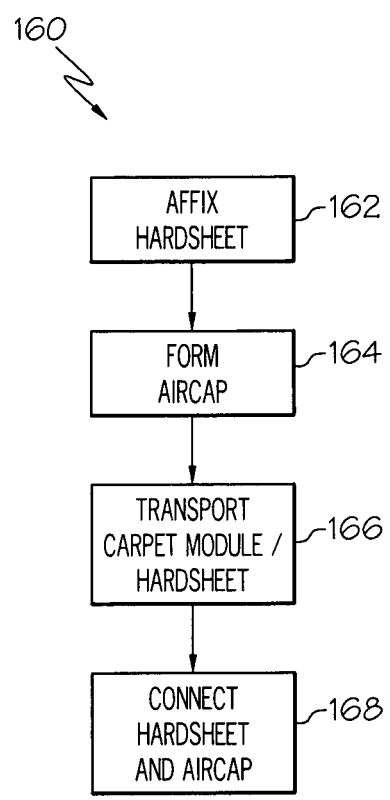
FIG. 11 illustrates a method of providing a floor aircap assembly for a vehicle air system according to one or more embodiments shown and described herein.

Referring to FIG. 11, a method 160 of providing a floor aircap assembly 12 for a vehicle air system 18 is provided. The method 160 includes affixing a hardsheet 14 to a back of a carpet module 84 at step 162. For example, the hardsheet 14 may be affixed to the carpet module 84 using an adhesive. The hardsheet 14 may be formed of the same or a different material as that forming the back of the carpet module 84. In some embodiments, the hardsheet is formed of a material that is harder than a material forming the back of the carpet module 84. At step 164, the aircap structure 16 is formed. The aircap structure 16 may be formed before, after or during the step of attaching the hardsheet 14 to the back of the carpet module 84. In some embodiments, the aircap structure 16 may be formed of the same or of a different material than that forming the hardsheet 14.

At step 166 the carpet module 84 and the hardsheet 14 may be transported as a single piece for installation to a vehicle assembly location. For example, step 162 may be performed at a supplier location that is different from the vehicle assembly location. In some embodiments, the aircap 16 may be also shipped to the vehicle assembly location with the carpet module 84 and the hardsheet 14. In another embodiment, the aircap 16 may be shipped to the vehicle assembly location separately from the carpet module 84 and the hardsheet 14. At step 168, the hardsheet 14 is connected to the aircap 16 as described above. In an alternative embodiment, the aircap 16 may be attached to the hardsheet 14 prior to the step of transporting the carpet module 84 and the hardsheet 14. Thus, in this embodiment, the carpet module, hardsheet 14 and aircap 16 may all be transported as a single piece for installation to a vehicle assembly location. In some embodiments, the aircap 16 may be in an installation position (see FIG. 3) prior to connecting the hardsheet 14 thereto. In other embodiments, the aircap 16 may be connected to the hardsheet 14 before placing the carpet module 84 in the vehicle 10.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An air system assembly for a vehicle, the air system assembly comprising:

a carpet module;

an HVAC unit above the carpet module;

a floor aircap assembly attached to the carpet module and comprising a hardsheet affixed to a back of the carpet module and an aircap affixed to the hardsheet to define an enclosure for receiving conditioned air from the HVAC unit and provide a load bearing structure for the carpet module, the floor aircap assembly having a vertical portion extending upwardly above the carpet module and a horizontal portion extending below the carpet module; and a duct that connects the floor aircap assembly to the HVAC unit, wherein the hardsheet of the floor aircap assembly is formed of a first material, the back of the carpet module is formed of a second material that is different from the first material, and the duct is formed of a third material that is harder than the first material, the first material having a noise insulating property greater than the third material.

2. The air system assembly of claim 1, wherein the first material is a polypropylene and fiber blend.

3. The air system assembly of claim 1, wherein the aircap has a flange that provides a seating surface for the hardsheet, the flange of the aircap being attached to the hardsheet with an adhesive or by welding.

4. The air system assembly of claim 1, wherein the HVAC unit is located at a rear of the vehicle.

5. The air system assembly of claim 1, wherein the floor aircap assembly has a first end that is closed and a second end that is open.

6. The air system assembly of claim 1, wherein the vertical portion of the floor aircap assembly extends upwardly through an opening in the carpet module.

7. A vehicle including an air system assembly, the vehicle comprising:
a carpet module;
a rear HVAC unit above the carpet module;
a floor aircap assembly affixed to a back of the carpet module to provide a load bearing structure for the carpet module, the floor aircap assembly comprising a hardsheet affixed to the back of the carpet module and an aircap affixed to the hardsheet to define an enclosure for receiving conditioned air from the HVAC unit; and
a duct connecting the HVAC unit and the floor aircap assembly;
wherein the hardsheet of the floor aircap assembly is formed of a first material, the back of the carpet module is formed of a second material that is different from the first material, and the duct is formed of a third material that is harder than the first material, the first material having a noise insulating property greater than the third material.

8. The vehicle of claim 7, wherein the second material is a polypropylene and fiber blend.

9. The vehicle of claim 7, wherein the floor aircap assembly has a vertical portion extending upwardly above the carpet module and a horizontal portion extending below the carpet module.

10. The vehicle of claim 7, wherein the aircap has a flange that provides a seating surface for the hardsheet the flange of the aircap being attached to the hardsheet with an adhesive or by welding.

11. The vehicle of claim 10, wherein the hardsheet has a plurality of openings extending therethrough over a broad surface of the hardsheet positioned proximate to the back of the carpet module.

12. A method of providing a floor aircap assembly for a vehicle, the method comprising:
forming a hardsheet for a floor aircap assembly;
affixing the hardsheet to a back of a carpet module at a location remote from a vehicle assembly location thereby providing a single hardsheet/carpet module assemblage for installation in a vehicle;
at a time subsequent to affixing the hardsheet to the back of the carpet module, affixing an aircap to the hardsheet to define an enclosure for receiving conditioned air from the HVAC unit and providing a load bearing structure for the carpet module; and
at a time subsequent to affixing the aircap to the hardsheet, connecting the HVAC unit to the aircap with a duct, wherein the hardsheet of the floor aircap assembly is formed of a first material, the back of the carpet module is formed of a second material that is different from the first material, and the duct is formed of a third material that is harder than the first material, the first material having a noise insulating property greater than the third material.

13. The method of claim 12, wherein the step of forming the hardsheet comprises forming the hardsheet with a vertical portion and a horizontal portion, the step of affixing the hardsheet to the back of the carpet module including locating the vertical portion of the hardsheet at least partially above the carpet module.

14. The method of claim 12, wherein the hardsheet is affixed to the back of the carpet module using an adhesive.

15. The method of claim 12 further comprising providing the hardsheet with a plurality of openings.

16. The method of claim 12, further comprising at a time subsequent to affixing the aircap to the hardsheet, transporting the carpet module, the hardsheet, and the aircap to a vehicle assembly location for installation into a vehicle.

17. The method of claim 12, wherein the aircap is affixed to the hardsheet by welding or adhering.

* * * * *

UNITED STATES PATENT AND TRADEMARK OFFICE
CERTIFICATE OF CORRECTION

PATENT NO.         : 8,632,382 B2
APPLICATION NO.    : 12/507842
DATED              : January 21, 2014
INVENTOR(S)        : Debby S. Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this
Third Day of November, 2015

Michelle K. Lee
*Director of the United States Patent and Trademark Office*